UNITED STATES PATENT OFFICE.

JOHN H. SIEGMAN, OF BALTIMORE, MARYLAND.

IMPROVEMENT IN COMPOUNDS FOR POLISHING AND COATING COFFEE.

Specification forming part of Letters Patent No. 166,641, dated August 10, 1875; application filed March 17, 1875.

*To all whom it may concern:*

Be it known that I, JOHN H. SIEGMAN, of the city of Baltimore and State of Maryland, have invented a new and Improved Compound for Polishing and Coating Coffee; and I do hereby declare the following to be a full, clear, and exact description thereof, which will enable those skilled in the art to make and use the same.

This invention relates to a compound made of rice or wheat flour, or similar substances, combined with gum-arabic and water in about the following proportions, according to the strength of flour: flour, ten pounds; water, eighteen gallons; gum-arabic, five ounces, which, when applied to roasted coffee, prevents shrinkage and protects the coffee against the moisture of the atmosphere, while at the same time my compound is cheap, and the increase in the weight of the coffee produced by its application more than compensates for the cost of the compound.

In order to mix these ingredients together, I dissolve the rice or wheat flour with the gum-arabic in cold water. Then I mix the solution together and apply the same to the coffee during the operation of roasting, or immediately after the coffee has been roasted and before it is cooled.

My compound protects the coffee against shrinkage, increases its weight, and prevents the liability of the berry absorbing dampness, by reason of each berry being coated, and thus renders the coffee impervious to moisture.

I do not claim, broadly, as my invention a compound for coating roasted coffee; but

What I claim as new, and desire to secure by Letters Patent, is—

A compound consisting of rice or wheat flour combined with gum-arabic and water, substantially as described, and for the purpose set forth.

JOHN H. SIEGMAN.

Witnesses:
HARRY C. ROUNTREE,
CHAS. P. WEBSTER.